(12) United States Patent
Rose et al.

(10) Patent No.: US 8,407,760 B2
(45) Date of Patent: Mar. 26, 2013

(54) APPARATUS AND METHOD FOR TRANSITIONING ACCESS RIGHTS FOR ROLE-BASED ACCESS CONTROL COMPATIBILITY

(75) Inventors: Gregory Gordon Rose, San Diego, CA (US); Alexander Gantman, Poway, CA (US); Lu Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 780 days.

(21) Appl. No.: 12/253,754

(22) Filed: Oct. 17, 2008

(65) Prior Publication Data

US 2010/0100933 A1    Apr. 22, 2010

(51) Int. Cl.
G06F 17/00 (2006.01)
G06F 7/04 (2006.01)
G06F 9/00 (2006.01)
G06F 21/00 (2006.01)

(52) U.S. Cl. .................... 726/2; 726/1; 726/11; 726/17; 713/182

(58) Field of Classification Search .................. 726/3, 1, 726/2, 11, 17; 713/182
See application file for complete search history.

(56) References Cited

U.S. PATENT DOCUMENTS

| | | | |
|---|---|---|---|
| 6,292,798 B1 | 9/2001 | Dockter et al. | |
| 6,965,751 B2 * | 11/2005 | Koga et al. | 434/350 |
| 7,890,531 B2 * | 2/2011 | Wallace et al. | 707/786 |
| 2006/0090208 A1 * | 4/2006 | Smith | 726/26 |
| 2006/0224590 A1 | 10/2006 | Boozer et al. | |
| 2010/0005518 A1 * | 1/2010 | Tirpak et al. | 726/6 |

OTHER PUBLICATIONS

International Search Report and Written Opinion—PCT/US2009/060760, International Search Authority—European Patent Office—Jul. 28, 2006.
Security Engineering: A Guide to Building Dependable Distributed Systems; Chapter 4: Access Control; 2001.
Ravi Sandhu, David Ferraiolo, Richard Kuhn; The NIST Model for Role-Based Access Control: Towards a Unified Standard; Jul. 26-27, 2000.

* cited by examiner

*Primary Examiner* — Mohammad W Reza
(74) *Attorney, Agent, or Firm* — Won Tae Kim (57) ABSTRACT

Disclosed is a method for transitioning access rights, in a remote station with role-based access control, for an unknown role having access rights defined by a central access control management module. In the method, a role capability table is maintained in the remote station specifying centrally-defined access rights of roles that are interpretable in the remote station. An access request associated with an unknown role that is not interpretable in the remote station is received. The access request includes a role transition list that relates the unknown role to other centrally-defined roles. At least one of the other centrally-defined roles is interpretable in the remote station. A role is selected, from the role transition list, that is interpretable in the remote station for interpreting the unknown role of the access request. Access is granted based on the access request associated with the unknown role using the access rights of the interpretable role selected from the role transition table.

26 Claims, 5 Drawing Sheets

APPARATUS AND METHOD FOR TRANSITIONING ACCESS RIGHTS FOR ROLE-BASED ACCESS CONTROL COMPATIBILITY

BACKGROUND

1. Field

The present invention relates generally to role-based access control, and more particularly, to a mechanism for role transition for a locally unknown role.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR-45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services.

Figure 1A:
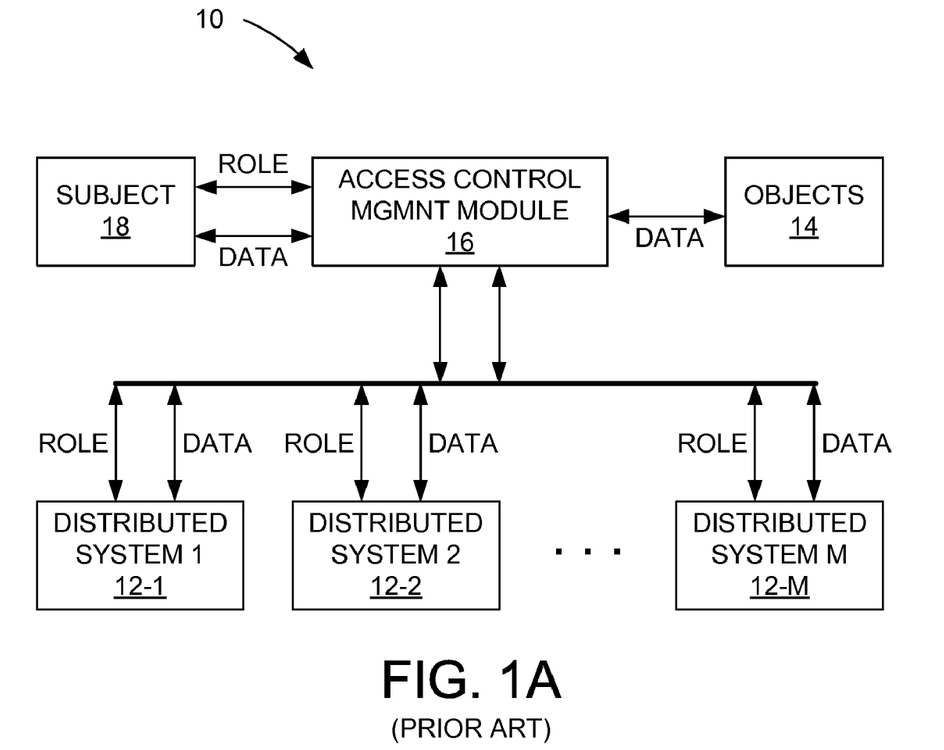
FIG. 1A is a block diagram of an example of a role-based access control system, as known in the prior art.
Figure 1B:
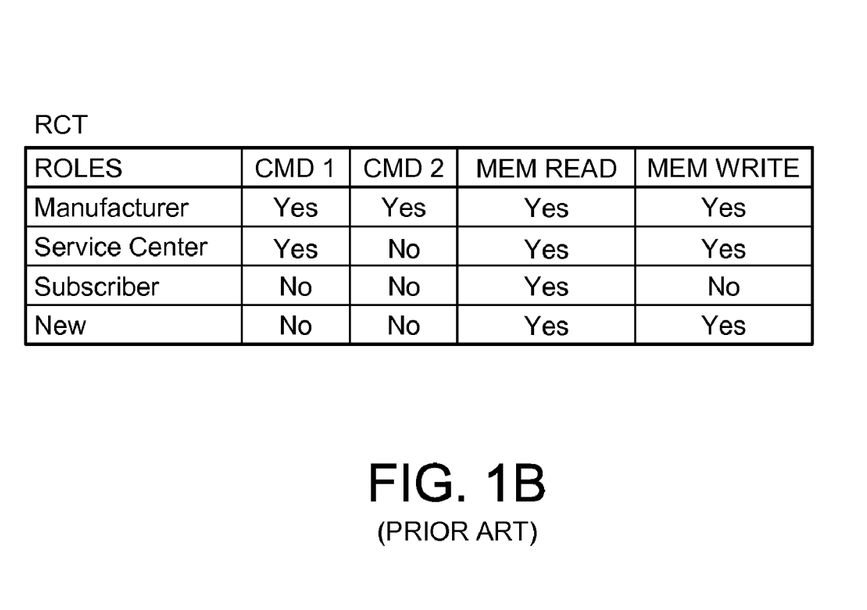
FIG. 1B is a role capacity table, as known in the prior art.

As shown in FIGS. 1A and 1B, in a role-based access control system 10, a role capability table RCT is defined clearly for each role. Many distributed systems 12-N may be developed autonomously in a large organization. To enforce access control, a distributed system usually maintains local capability tables which store the capabilities or access rights of different roles to those resources or objects 14 controlled locally. When a new role is defined by an access control management module 16, under current role-based access management, each distributed system must receive or create a corresponding capability table in order to grant appropriate access rights to a subject 18 associated with the new role. This is not realistic when many distributed systems have been deployed that cannot be updated in a practical or timely manner.

There is therefore a need for a mechanism of transitioning for a locally unknown role, in a cost effective and efficient manner.

SUMMARY

An aspect of the present invention may reside in a method for transitioning access rights, in a remote station with role-based access control, for an unknown role having access rights defined by a central access control management module. In the method, a role capability table is maintained in the remote station specifying centrally-defined access rights of roles that are interpretable in the remote station. An access request associated with an unknown role that is not interpretable in the remote station is received. The access request includes a role transition list that relates the unknown role to other centrally-defined roles. At least one of the other centrally-defined roles is interpretable in the remote station. A role is selected, from the role transition list, that is interpretable in the remote station for interpreting the unknown role of the access request. Access is granted based on the access request associated with the unknown role using the access rights of the interpretable role selected from the role transition table.

In more details aspects of the invention, the access rights may be transitioned in accordance with a security-preferred transition policy, and the access rights of the selected interpretable role may be a subset of the access rights of the unknown role.

Alternatively, the access rights may be transitioned in accordance with an availability-preferred transition policy, and the access rights of the selected interpretable role may be a superset of the access rights of the unknown role. The remote station may comprise a distributed system, which may be a mobile station.

In other more detailed aspects of the invention, the role transition list may be created by the central access control management module. The centrally-defined roles in the role transition list may be evaluated with respect to the access request role by the following equation:

$$A(S_x) = \sum_{i=1}^{N} w_i C_i, \ (C_i \in S_x)$$

where $A(S_x)$ is a weighted sum of indivisible capabilities owned by access request role, N is a total number of capabilities C, of the access rights defined by the central access control management module, and $w_i$ is a weight assigned to indivisible capability $C_i$.

Another aspect of the invention may reside in a remote station with role-based access control, comprising: means for maintaining a role capability table in the remote station specifying centrally-defined access rights of roles that are interpretable in the remote station; means for receiving an access request associated with an unknown role that is not interpretable in the remote station and that has access rights defined by a central access control management module, the access request including a role transition list that relates the unknown role to other centrally-defined roles, wherein at least one of the other centrally-defined roles is interpretable in the remote station; means for selecting, from the role transition list, a role that is interpretable in the remote station, for interpreting the unknown role of the access request; and means for granting access based on the access request associated with the unknown role using the access rights of the interpretable role selected from the role transition table.

Another aspect of the invention may reside in an apparatus with role-based access control, comprising: a processor configured to: maintain a role capability table in the apparatus specifying centrally-defined access rights of roles that are interpretable in the apparatus; receive an access request associated with an unknown role that is not interpretable in the apparatus and that has access rights defined by a central access control management module, the access request including a role transition list that relates the unknown role to other centrally-defined roles, wherein at least one of the other centrally-defined roles is interpretable in the apparatus; select, from the role transition list, a role that is interpretable in the apparatus, for interpreting the unknown role of the access request; and grant access based on the access request associated with the unknown role using the access rights of the interpretable role selected from the role transition table.

Yet another aspect of the invention may reside in a computer program product, comprising: computer-readable medium, comprising: code for causing a computer to maintain a role capability table in the computer specifying centrally-defined access rights of roles that are interpretable in the computer; code for causing a computer to receive an access request associated with an unknown role that is not interpretable in the computer and that has access rights defined by a central access control management module, the access request including a role transition list that relates the unknown role to other centrally-defined roles, wherein at least one of the other centrally-defined roles is interpretable in the computer; code for causing a computer to select, from the role transition list, a role that is interpretable in the computer, for interpreting the unknown role of the access request; and code for causing a computer to grant access based on the access request associated with the unknown role using the access rights of the interpretable role selected from the role transition table.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 2:
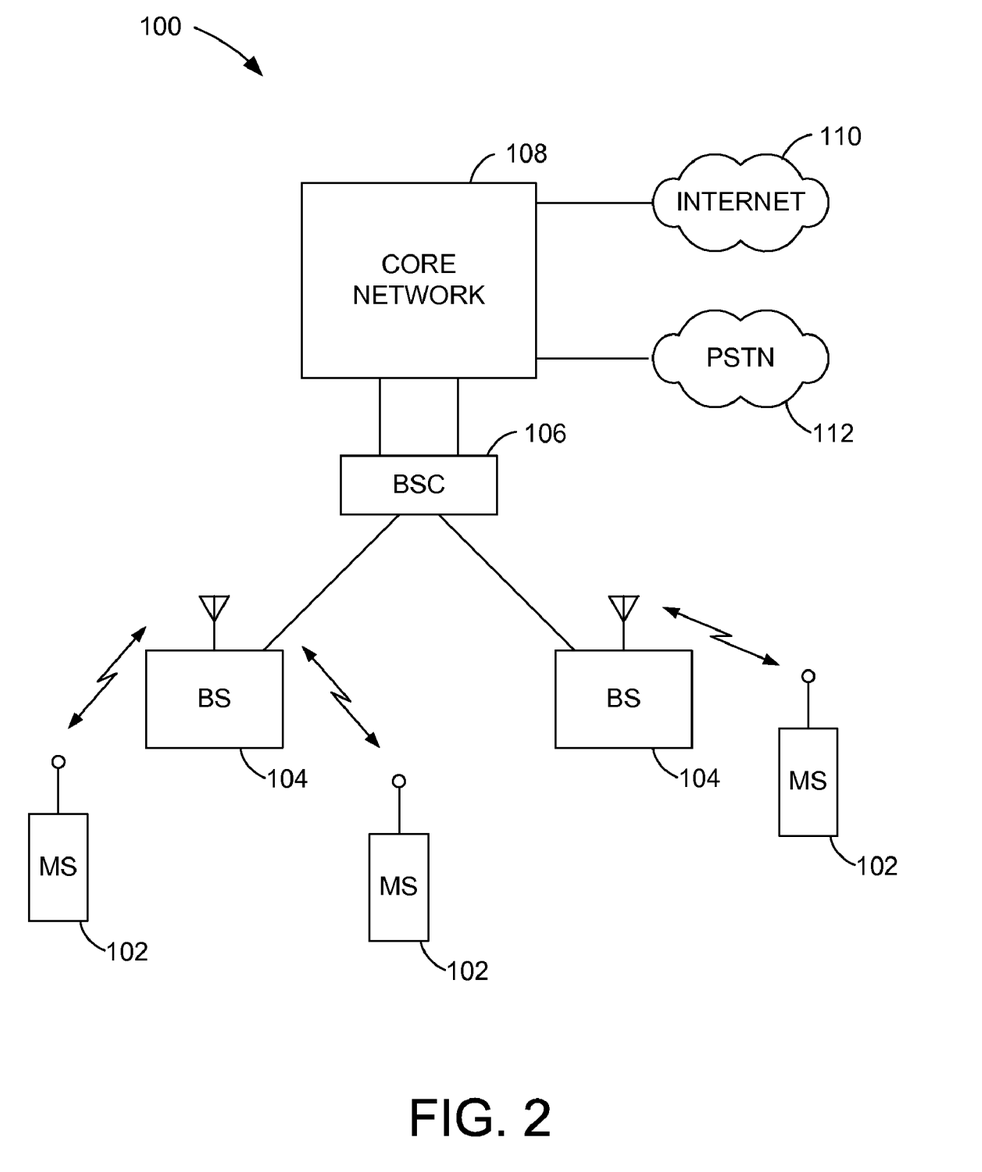
FIG. 2 is a block diagram of an example of a wireless communication system.

With reference to FIG. 2, a wireless communication system 100 includes one or more wireless mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 3:
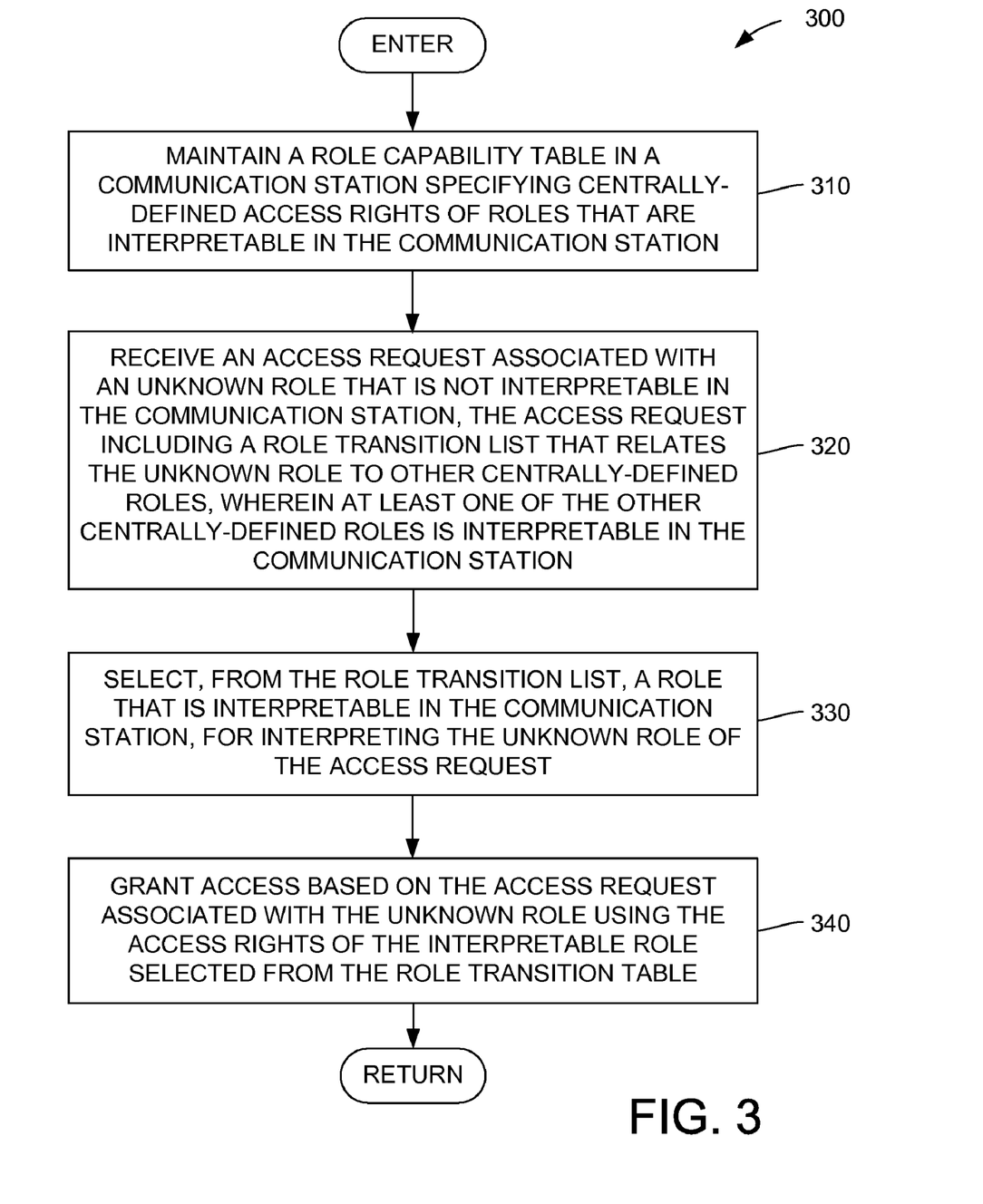
FIG. 3 is a flow diagram of a method for transitioning role-based access rights for a locally unknown role in a remote station.
Figure 4:
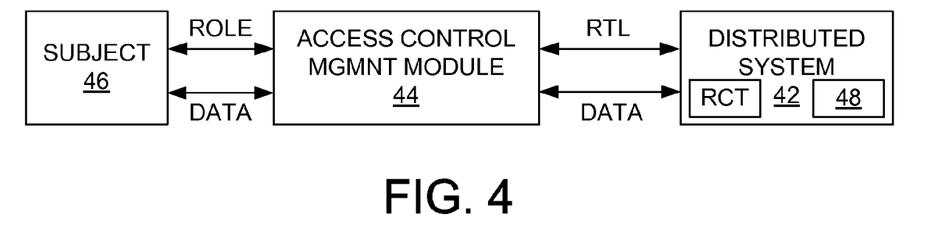
FIG. 4 is a block diagram of a role-based access control system with a mobile remote station having transitioning of role-based access rights for compatibility.

With reference to FIGS. 3 and 4, an aspect of the present invention may reside in a method 300 (FIG. 3) for transitioning access rights, in a remote station (e.g., distributed system 42, FIG. 4) with role-based access control, for an unknown role having access rights defined by a central access control management module 44. In the method, a role capability table RCT is maintained in the remote station specifying centrally-defined access rights of roles that are interpretable in the remote station (step 310). An access request associated with an unknown role that is not interpretable in the remote station is received (step 320). The access request includes a role transition list RTL that relates the unknown role to other centrally-defined roles. At least one of the other centrally-defined roles is interpretable in the remote station. A role is selected, from the role transition list, that is interpretable in the remote station for interpreting the unknown role of the access request (step 330). Access is granted based on the access request associated with the unknown role using the access rights of the interpretable role selected from the role transition table (step 340).

In a distributed system, adding a new role to an existing role capability table RCT (FIG. 1B) may not be practical because a complete capability list may be very large and each distributed system may use only a small subset. Also, the distributed system may have hardwired access control tables, which may be hard or impossible to update.

Figure 5:
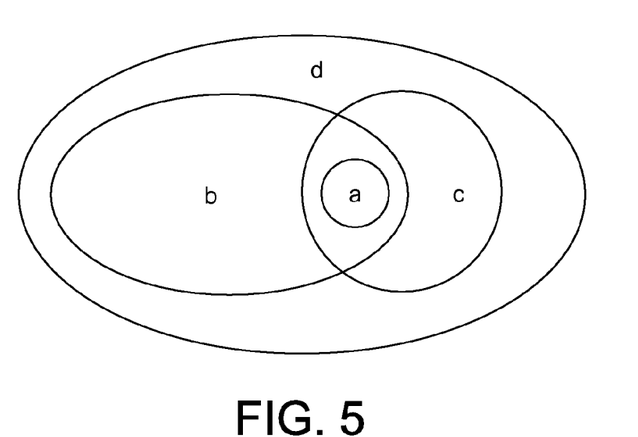
FIG. 5 is a schematic diagram of capability sets or access rights associated with different roles.

With reference to FIG. 5, four example capability sets, a, b, c and d, are shown with the relative breath of the respective role's access rights. Set a has the most limited capabilities, while set d has the broadest capabilities. More specifically, set a is a subset of set b, c and d; set c is a subset of set d; and set b is a subset of set d. Conversely, sets b, c and d, are supersets of set a; and set d is a super set of both set b and set c. This invention enables a distributed system to find a locally interpretable role (Role y) which forms the optimal approximation of capabilities of an unknown role (Role x), guarded by a certain role transition policy.

Thus, in more detailed aspects of the invention, the access rights may be transitioned in accordance with a security-preferred transition policy, and the access rights of the selected interpretable role (Role y) are a subset of the access rights of the unknown role (Role x), e.g., $S_y \subset S_x$. Alternatively, the access rights may be transitioned in accordance with an availability-preferred transition policy, and the access rights of the selected interpretable role (Role y) are a superset of the access rights of the unknown role (Role x), e.g., $S_x \subset S_y$.

A role transition list RTL is created for each new role by the central access control management module 44. A distributed system 42 scans the RLT until an interpretable role is reached, which role is guaranteed to be the most approximate role allowed locally.

A metric, denoted by $A(S_x)$, is used to quantize the area of the capability set associated with Role x. $A(S_x)$ is the weighted sum of indivisible capabilities owned by Role x. The centrally-defined roles in the role transition list may be evaluated with respect to the access request role by the following equation:

$$A(S_x) = \sum_{i=1}^{N} w_i C_i, (C_i \in S_x)$$

where $A(S_x)$ is a weighted sum of indivisible capabilities owned by access request role, N is a total number of capabilities C, of the access rights defined by the central access control management module, and $w_i$ is a weight assigned to indivisible capability $C_i$.

An indivisible capability can only be evaluated by Yes (i.e., 1) or No (i.e., 0). For example, the access to a file may derive at least capabilities or access rights of reading and writing, which can be either Yes or No.

Using the above metric for the four sets in FIG. 5 results in the following ordering for the RTL:

$A(S_a) < A(S_c) < A(S_b) < A(S_d)$

As mentioned before, set a is the subset of set b and set c, while set b and set c are both the subsets of set d:

$S_a \subset S_b, S_a \subset S_c$,
$S_b \subset S_d, S_c \subset S_d$.

To enforce a security-preferred transition policy, one most limited role must be defined for all distributed systems so that its capabilities are owned by all new roles (e.g., guest in most systems). In FIG. 5, the most limited role is role a. Suppose roles b, c, d are later defined new roles, and it is not clear which roles are supported in a given distributed system.

To create a role transition list RTL for a new role d, the metric A(.) is used to sort all roles whose capability sets are subsets of $S_d$. The result is: b, c, a in decreasing order. The RTL for role d can be written as: d->b->c->a.

Similarly, for new roles b and c:
the RTL of Role b: b->a,
the RTL of Role c: c->a.

Figure 6:
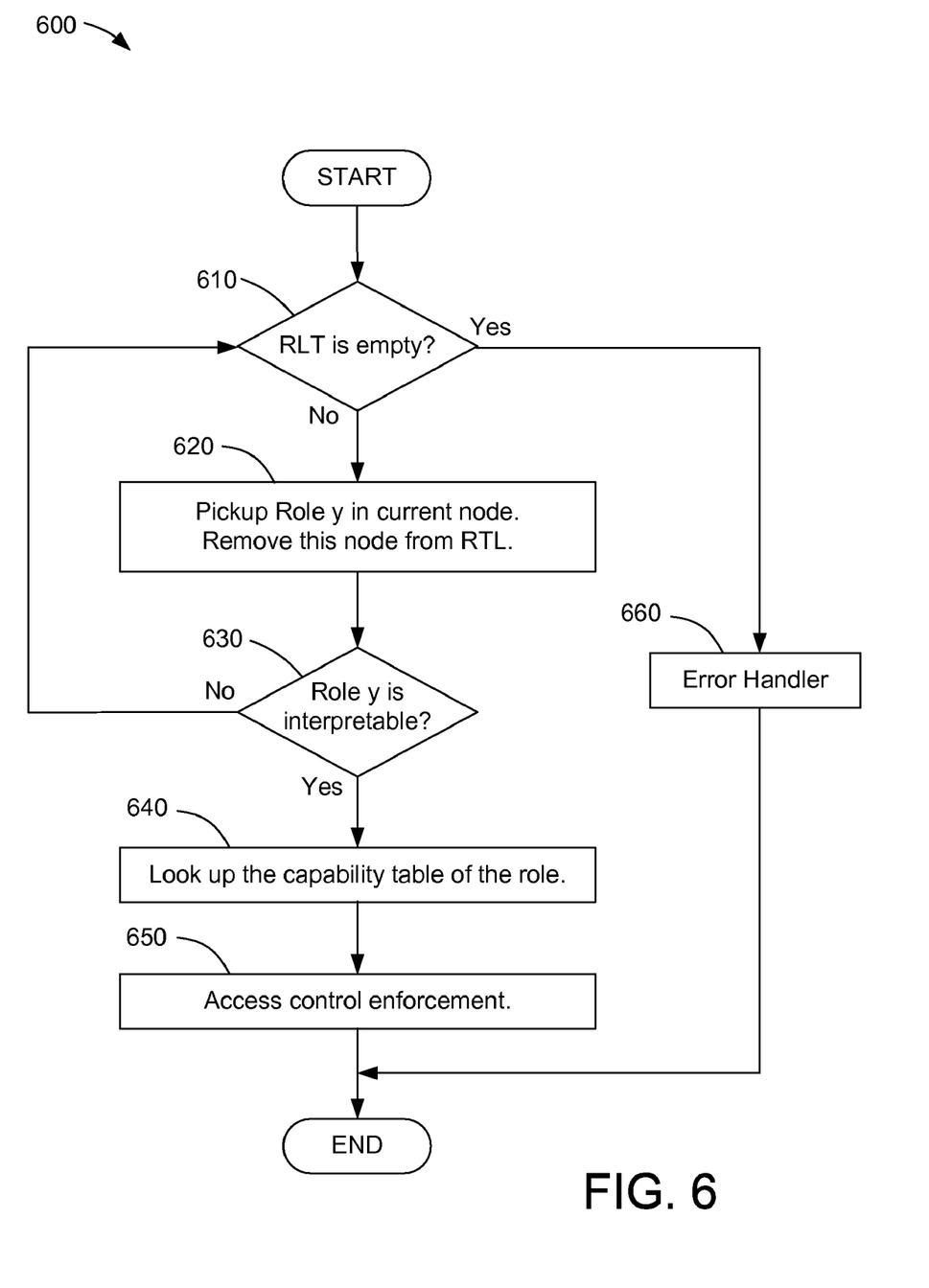
FIG. 6 is a flow diagram of a method for scanning a role transition list for a locally interpretable role.

With reference again to FIG. 4, the central access control management module 44 sends the RTL of a new role to a distributed system 42 when the new role wants to access an object or resource in the distributed system. The first node in the list is the new role x itself. As shown by the method 600 in FIG. 6, the distributed system scans the RTL (step 610) by picking a role y in a current node of the RTL, and removing the node (step 620). If the distributed system cannot interpret this new role (step 630), the next role in the RTL will be parsed. The list is checked node by node until an interpretable role y is located locally. When the optimal approximation to the new role is located, within a certain transition policy, that role's capability table is accessed (step 640). Access control enforcement is implemented using capabilities or access rights of the select role y (step 650). If the RTL for the unknown role x is empty, the process moves to an error handler routine (step 660)

Thus, given a new role x, the following steps implement a security-preferred role transition: (1) Predefine the most limited role for all distributed systems (most powerful role for availability-preferred transition); (2) Find all roles whose capability sets are subsets of $S_x$ (supersets of $S_x$ for availability-preferred transition); (3) Sort all these roles using the metric A(.) in decreasing order (increasing order for availability preferred transition), which forms the RTL; (4) Send the RTL instead of the role information to each distributed system for access control enforcement. This mechanism for role transition in an access control system enables distributed systems to handle a role with capabilities that are not locally defined, and provides multi-level role transition for system compatibility.

Figure 7:
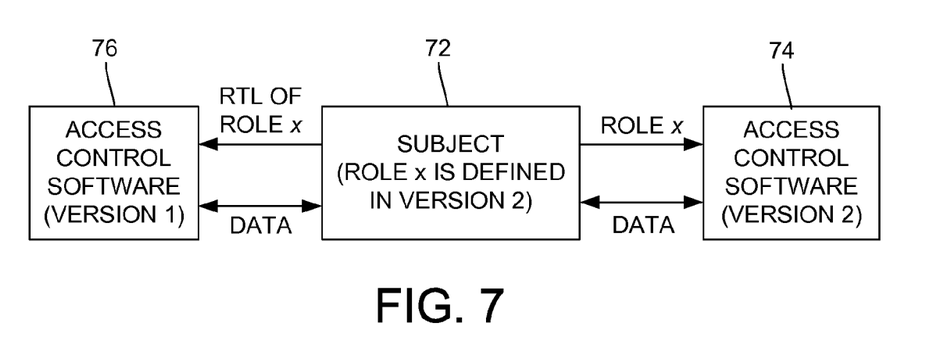
FIG. 7 is a block diagram of a role-based access control system with control software version compatibility.

As shown in FIG. 7, a similar technique may be used when a subject 72 wants to access objects in several systems with different versions of access control software. Each version of control software is required to contain the logic shown in FIG. 6. As a result, a role defined in the new version of access control software 74 can be processed by an older version of access control software 76 if the RTL contains any role interpretable in the old version.

Another aspect of the invention may reside in a remote station 42 with role-based access control, comprising: means 48 for maintaining a role capability table RCT in the remote station specifying centrally-defined access rights of roles that are interpretable in the remote station; means 48 for receiving an access request associated with an unknown role that is not interpretable in the remote station and that has access rights defined by a central access control management module 44, the access request including a role transition list RTL that relates the unknown role to other centrally-defined roles, wherein at least one of the other centrally-defined roles is interpretable in the remote station; means 48 for selecting, from the role transition list, a role that is interpretable in the remote station, for interpreting the unknown role of the access request; and means 48 for granting access based on the access request associated with the unknown role using the access rights of the interpretable role selected from the role transition table.

Another aspect of the invention may reside in an apparatus 42 with role-based access control, comprising: a processor 48 configured to: maintain a role capability table RCT in the apparatus specifying centrally-defined access rights of roles that are interpretable in the apparatus; receive an access request associated with an unknown role that is not interpretable in the apparatus and that has access rights defined by a central access control management module 44, the access request including a role transition list RTL that relates the unknown role to other centrally-defined roles, wherein at least one of the other centrally-defined roles is interpretable in the apparatus; select, from the role transition list, a role that is interpretable in the apparatus, for interpreting the unknown role of the access request; and grant access based on the access request associated with the unknown role using the access rights of the interpretable role selected from the role transition table.

Yet another aspect of the invention may reside in a computer program product, comprising: computer-readable medium, comprising: code for causing a computer 42 to maintain a role capability table RCT in the computer specifying centrally-defined access rights of roles that are interpretable in the computer; code for causing a computer to receive an access request associated with an unknown role that is not interpretable in the computer and that has access rights defined by a central access control management module 44, the access request including a role transition list RTL that relates the unknown role to other centrally-defined roles, wherein at least one of the other centrally-defined roles is interpretable in the computer; code for causing a computer to select, from the role transition list, a role that is interpretable in the computer, for interpreting the unknown role of the access request; and code for causing a computer to grant access based on the access request associated with the unknown role using the access rights of the interpretable role selected from the role transition table.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method operational in a remote station with role-based access control for transitioning access rights, comprising:
   maintaining a role capability table in the remote station specifying centrally-defined access rights of roles that are interpretable in the remote station;
   receiving, at the remote station, an access request associated with a first role having access rights predefined by a central access control management module, where the first role is unknown to the remote station and not interpretable in the remote station, the access request including a role transition list that relates the first role to other centrally-defined roles, wherein at least one of the other centrally-defined roles is interpretable in the remote station;
   selecting, from the role transition list, a role that is interpretable in the remote station, for interpreting the first role of the access request; and
   granting access based on the access request associated with the first role using the access rights of the interpretable role selected from the role transition table.

2. A method for transitioning access rights as defined in claim 1, wherein:
   transitioning of the access rights is in accordance with a security-preferred transition policy, and
   the access rights of the selected interpretable role are a subset of the access rights of the first role.

3. A method for transitioning access rights as defined in claim 1, wherein:
   transitioning of the access rights is in accordance with an availability-preferred transition policy, and
   the access rights of the selected interpretable role are a superset of the access rights of the first role.

4. A method for transitioning access rights as defined in claim 1, wherein the role transition list is created by the central access control management module.

5. A method for transitioning access rights as defined in claim 1, wherein the centrally-defined roles in the role transition list are evaluated with respect to the access request associated with the first role by the following equation:

$$A(S_x) = \sum_{i=1}^{N} w_i C_i, (C_i \in S_x)$$

where $A(S_x)$ is a weighted sum of indivisible capabilities owned by the first role, N is a total number of capabilities $C_i$ of the access rights defined by the central access control management module, and $w_i$ is a weight assigned to indivisible capability $C_i$.

6. A method for transitioning access rights as defined in claim 1, wherein the remote station comprises a mobile station.

7. A method for transitioning access rights as defined in claim 1, wherein the remote station comprises a distributed system.

8. A remote station with role-based access control, comprising:
   means for maintaining a role capability table in the remote station specifying centrally-defined access rights of roles that are interpretable in the remote station;
   means for receiving an access request associated with a first role having access rights predefined by a central access control management module, where the first role is unknown to the remote station and not interpretable in the remote station, the access request including a role transition list that relates the first role to other centrally-defined roles, wherein at least one of the other centrally-defined roles is interpretable in the remote station;
   means for selecting, from the role transition list, a role that is interpretable in the remote station, for interpreting the first role of the access request; and
   means for granting access based on the access request associated with the first role using the access rights of the interpretable role selected from the role transition table.

9. A remote station with role-based access control as defined in claim 8, wherein:
   the access rights are transitioned in accordance with a security-preferred transition policy, and
   the access rights of the selected interpretable role are a subset of the access rights of the first role.

10. A remote station with role-based access control as defined in claim 8, wherein:
    the access rights are transitioned in accordance with an availability-preferred transition policy, and
    the access rights of the selected interpretable role are a superset of the access rights of the first role.

11. A remote station with role-based access control as defined in claim 8, wherein the role transition list is created by the central access control management module.

12. A remote station with role-based access control as defined in claim 8, wherein the centrally-defined roles in the role transition list are evaluated with respect to the access request associated with the first role by the following equation:

$$A(S_x) = \sum_{i=1}^{N} w_i C_i, (C_i \in S_x)$$

where $A(S_x)$ is a weighted sum of indivisible capabilities owned by the first role, N is a total number of capabilities $C_i$ of the access rights defined by the central access control management module, and $w_i$ is a weight assigned to indivisible capability $C_i$.

13. A remote station with role-based access control as defined in claim 8, wherein the remote station comprises a mobile station.

14. A remote station with role-based access control as defined in claim 8, wherein the remote station comprises a distributed system.

15. An apparatus with role-based access control, comprising:
    a processing circuit configured to:
       maintain a role capability table in the apparatus specifying centrally-defined access rights of roles that are interpretable in the apparatus;
       receive an access request associated with an a first role having access rights predefined by a central access control management module, where the first role is unknown to the remote station and not interpretable in the apparatus, the access request including a role transition list that relates the first role to other centrally-defined roles, wherein at least one of the other centrally-defined roles is interpretable in the apparatus;
       select, from the role transition list, a role that is interpretable in the apparatus, for interpreting the first role of the access request; and
       grant access based on the access request associated with the first role using the access rights of the interpretable role selected from the role transition table.

16. An apparatus with role-based access control as defined in claim 15, wherein:
the access rights are transitioned in accordance with a security-preferred transition policy, and
the access rights of the selected interpretable role are a subset of the access rights of the first role.

17. An apparatus with role-based access control as defined in claim 15, wherein:
the access rights are transitioned in accordance with an availability-preferred transition policy, and
the access rights of the selected interpretable role are a superset of the access rights of the first role.

18. An apparatus with role-based access control as defined in claim 15, wherein the role transition list is created by the central access control management module.

19. An apparatus with role-based access control as defined in claim 15, wherein the centrally-defined roles in the role transition list are evaluated with respect to the access request associated with the first role by the following equation:

$$A(S_x) = \sum_{i=1}^{N} w_i C_i, (C_i \in S_x)$$

where $A(S_x)$ is a weighted sum of indivisible capabilities owned by the first role, N is a total number of capabilities $C_i$ of the access rights defined by the central access control management module, and $w_i$ is a weight assigned to indivisible capability $C_i$.

20. An apparatus with role-based access control as defined in claim 15, wherein the apparatus comprises a mobile station.

21. An apparatus with role-based access control as defined in claim 15, wherein the apparatus comprises a distributed system.

22. A non-transitory computer-readable medium having instructions stored thereon which when executed by at least one processor causes the processor to
maintain a role capability table in the computer specifying centrally-defined access rights of roles that are interpretable in the computer;
receive an access request associated with a first role having access rights predefined by a central access control management module, where the first role is unknown to the remote station and not interpretable in the computer, the access request including a role transition list that relates the first role to other centrally-defined roles, wherein at least one of the other centrally-defined roles is interpretable in the computer;
select, from the role transition list, a role that is interpretable in the computer, for interpreting the first role of the access request; and
grant access based on the access request associated with the first role using the access rights of the interpretable role selected from the role transition table.

23. The non-transitory computer-readable medium of claim 22, wherein:
transitioning of the access rights is in accordance with a security-preferred transition policy, and
the access rights of the selected interpretable role are a subset of the access rights of the first role.

24. The non-transitory computer-readable medium of claim 22, wherein:
transitioning of the access rights is in accordance with an availability-preferred transition policy, and
the access rights of the selected interpretable role are a superset of the access rights of the first role.

25. The non-transitory computer-readable medium of claim 22, wherein the role transition list is created by the central access control management module.

26. The non-transitory computer-readable medium of claim 22, wherein distributed system defined roles in the role transition list are evaluated with respect to the access request associated with the first role by the following equation:

$$A(S_x) = \sum_{i=1}^{N} w_i C_i, (C_i \in S_x)$$

where $A(S_x)$ is a weighted sum of indivisible capabilities owned by the first role, N is a total number of capabilities $C_i$ of the access rights defined by the central access control management module, and $w_i$ is a weight assigned to indivisible capability $C_i$.

* * * * *